United States Patent
Xu

(10) Patent No.: US 9,274,636 B2
(45) Date of Patent: Mar. 1, 2016

(54) EMBEDDED TOUCH ARRAY SUBSTRATE AND LIQUID CRYSTAL DISPLAY PANEL

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 112 days.

(21) Appl. No.: 14/240,694

(22) PCT Filed: Jan. 9, 2014

(86) PCT No.: PCT/CN2014/070361
§ 371 (c)(1),
(2) Date: Feb. 24, 2014

(87) PCT Pub. No.: WO2015/096214
PCT Pub. Date: Jul. 2, 2015

(65) Prior Publication Data
US 2015/0268774 A1    Sep. 24, 2015

(30) Foreign Application Priority Data
Dec. 26, 2013   (CN) .......................... 2013 1 0730114

(51) Int. Cl.
| | | |
|---|---|---|
| G06F 3/041 | (2006.01) | |
| G02F 1/1333 | (2006.01) | |
| G02F 1/1335 | (2006.01) | |
| G02F 1/1362 | (2006.01) | |
| G02F 1/1368 | (2006.01) | |
| G06F 3/044 | (2006.01) | |

(52) U.S. Cl.
CPC ............ *G06F 3/0412* (2013.01); *G02F 1/1333* (2013.01); *G02F 1/1368* (2013.01); *G02F 1/13338* (2013.01); *G02F 1/133514* (2013.01); *G02F 1/136286* (2013.01); *G06F 3/044* (2013.01); *G06F 3/0416* (2013.01)

(58) Field of Classification Search
None
See application file for complete search history.

(56) References Cited

U.S. PATENT DOCUMENTS

2011/0310035 A1 * 12/2011 Kim et al. ..................... 345/173

* cited by examiner

*Primary Examiner* — Kenneth B Lee, Jr.
(74) *Attorney, Agent, or Firm* — Andrew C. Cheng

(57) ABSTRACT

The present invention discloses an embedded touch array substrate, which comprises: multiple pairs of gate scanning lines and data lines arranged alternately; a pixel switch electrically connected with the gate scanning lines and the data lines; a pixel electrode electrically connected with the pixel switch; a touch emission line provided between two pairs of the gate scanning lines adjacent to each other; a touch receiving line provided between two pairs of the data lines adjacent to each other and intersecting the touch emission line; and a touch unit electrically connected with the intersection of the touch emission line and the touch receiving line. The gate scanning line and the data line according to the present invention utilize double lines, which provide individual trace area for the touch emission line and the touch receiving line. It further decreases the interference between the panel driving signal and the touch signal.

14 Claims, 3 Drawing Sheets

EMBEDDED TOUCH ARRAY SUBSTRATE AND LIQUID CRYSTAL DISPLAY PANEL

This application is claiming a priority arisen from a patent application, entitled with "Embedded Touch Array Substrate and Liquid Crystal Display Panel", submitted to China Patent Office on Dec. 26, 2013, designated with an Application Number 201310730114.7. The whole and complete disclosure of such patent application is hereby incorporated by reference. This application also related to National Stage application Ser. No. 14/240,479, submitted on the same date, entitled, "Liquid Crystal Display Touch Screen Array Substrate and the Corresponding Liquid Crystal Display Touch Screen"; National Stage application Ser. No. 14/240,683, submitted on the same date, entitled, "Liquid Crystal Display Touch Screen Array Substrate and the Corresponding Liquid Crystal Display Touch Screen"; and National Stage application Ser. No. 14/240,709, submitted on the same date, entitled, "Array Substrate Common Electrode Structure, the Manufacturing Method Thereof, and Array Substrate" assigned to the same assignee.

BACKGROUND OF THE INVENTION

1. Field of the Invention

The present invention relates to the technology fields of image display, and in particular to an embedded touch array substrate and a liquid crystal display panel.

2. The Related Arts

Recently, liquid crystal display (LCD) technology has developed rapidly. It has made great progress from the size of the screen to the display quality. LCD has several characteristics of small size, low power consumption, and no radiation, which has dominated the field of flat panel display.

Liquid crystal display touch screen is one of the major carriers to integrate the input and the output terminal. Recently, with a series of available products of the handheld devices with compact and lightweight, the market demand for liquid crystal display touch screen is surging.

The development directions of touch technology trend to low cost, high yield, large-size, high reliability, etc. In order to achieve the goal, in structure, there are on-cell and in-cell built-touch structures. In-Cell structure are highly integrated and low qualified. The touch device has thin thickness and light weight. FIG. 1 shows the circuit structure of the in-cell touch array substrate panel according to the existing technology, which comprises multiple gate scanning lines 1' and data lines 2' used for display arranged alternately, and a touch emission line 3' and a touch receiving line 4' used for touch. Wherein, because the touch emission line 3' is closer to the gate scanning line 1', and the touch receiving line 4' is closer to the data line 2', there are interference existing between the panel driving signal and the touch signal, which greatly reduces the touch sensitivity.

SUMMARY OF THE INVENTION

The technical issue to be solved by the present invention is to provide an embedded touch array substrate and a liquid crystal display panel which can reduce the signal interference and enhance the touch sensitivity.

In order to solve the technical issue, the embodiment according to the present invention provides an embedded touch array substrate, which comprises: multiple pairs of gate scanning lines and data lines arranged alternately; a pixel switch electrically connected with the gate scanning lines and the data lines; a pixel electrode electrically connected with the pixel switch; a touch emission line provided between two pairs of the gate scanning lines adjacent to each other; a touch receiving line provided between two pairs of the data lines adjacent to each other and intersecting the touch emission line; and a touch unit electrically connected with the intersection of the touch emission line and the touch receiving line.

Wherein, each pair of the gate scanning lines comprise a first gate scanning line and a second gate scanning line parallel and adjacent to each other, the distance between two pairs of the gate scanning lines adjacent to each other is larger than that between the first gate scanning line and the second gate scanning line.

Wherein, each pair of the data lines comprise a first data line and a second data line, the distance between two pairs of the data lines adjacent to each other is larger than that between the first data line and the second data line.

Wherein, the first gate scanning line is located above the second gate scanning line, and the first data line is located at the right side of the second data line.

Wherein, the pixel switches and the pixel electrodes electrically connected with the first gate scanning line are respectively symmetrical to the pixel switches and the pixel electrodes electrically connected with the second gate scanning line; the pixel switches and the pixel electrodes electrically connected with the first data line are respectively symmetrical to the pixel switches and the pixel electrodes electrically connected with the second data line.

Wherein, the pixel switch is a thin film transistor.

Wherein, the touch unit comprises a first touch point and a second touch point, the first touch point is electrically connected to the touch emission line, and the second touch point is electrically connected to the touch receiving line.

Wherein, the touch emission line and the gate scanning line utilize the same metal patterning, and the touch receiving line and the data line utilize the same metal patterning.

The present invention further provides an embedded touch array substrate, which comprises: multiple pairs of gate scanning lines and data lines arranged alternately; a pixel switch electrically connected with the gate scanning lines and the data lines; a pixel electrode electrically connected with the pixel switch; a touch emission line provided between two pairs of the gate scanning lines adjacent to each other; a touch receiving line provided between two pairs of the data lines adjacent to each other and intersecting the touch emission line; and a touch unit electrically connected with the intersection of the touch emission line and the touch receiving line; wherein, each pair of the gate scanning lines comprise a first gate scanning line and a second gate scanning line parallel and adjacent to each other, the distance between two pairs of the gate scanning lines adjacent to each other is larger than that between the first gate scanning line and the second gate scanning line.

The present invention further provides a liquid crystal display panel, comprising: an embedded touch array substrate; a color filter substrate, which is opposite to the embedded touch array substrate; and a liquid crystal layer, which is provided between the embedded touch array substrate and the color filter substrate; wherein, the embedded touch array substrate comprises: multiple pairs of gate scanning lines and data lines arranged alternately; a pixel switch electrically connected with the gate scanning lines and the data lines; a pixel electrode electrically connected with the pixel switch; a touch emission line provided between two pairs of the gate scanning lines adjacent to each other; a touch receiving line provided between two pairs of the data lines adjacent to each other and intersecting the touch emission line; and a touch unit electrically connected with the intersection of the touch emission line and the touch receiving line.

Wherein, each pair of the gate scanning lines comprise a first gate scanning line and a second gate scanning line parallel and adjacent to each other, the distance between two pairs of the gate scanning lines adjacent to each other is larger than that between the first gate scanning line and the second gate scanning line.

Wherein, each pair of the data lines comprise a first data line and a second data line, the distance between two pairs of the data lines adjacent to each other is larger than that between the first data line and the second data line.

Wherein, the first gate scanning line is located above the second gate scanning line, and the first data line is located at the right side of the second data line.

Wherein, the pixel switches and the pixel electrodes electrically connected with the first gate scanning line are respectively symmetrical to the pixel switches and the pixel electrodes electrically connected with the second gate scanning line; the pixel switches and the pixel electrodes electrically connected with the first data line are respectively symmetrical to the pixel switches and the pixel electrodes electrically connected with the second data line.

Wherein, the pixel switch is a thin film transistor.

Wherein, the touch unit comprises a first touch point and a second touch point, the first touch point is electrically connected to the touch emission line, and the second touch point is electrically connected to the touch receiving line.

Wherein, the touch emission line and the gate scanning line utilize the same metal patterning, and the touch receiving line and the data line utilize the same metal patterning.

In the embedded touch array substrate and the liquid crystal display panel according to the present invention, the gate scanning line and the data line utilize double lines, which provide individual trace area for the touch emission line and the touch receiving line. It further decreases the interference between the panel driving signal and the touch signal, enhances the touch sensitivity, decreases the signal amplitude, and reduces the power consumption of the panel.

BRIEF DESCRIPTION OF THE DRAWINGS

In order to more clearly illustrate the embodiment of the present invention or the technical issue of the prior art, the accompanying drawings and the detailed descriptions are as follows. Obviously, the following description of the accompanying drawings are only some embodiments according to the present invention, for persons of ordinary skill in this field, they can also obtain other drawings based on these drawings without creative effort.

DETAILED DESCRIPTION OF THE PREFERRED EMBODIMENTS

The following description of the embodiments with reference to the attached drawings, the present invention may be used to illustrate the specific embodiments to implement. The present invention mentioned directional terms, such as "upper", "lower", "front", "rear", "Left", "Right", "top", "bottom", "horizontal", "vertical", etc. only with reference to the accompanying drawings, in the direction. Therefore, the use of directional terms are used to describe and understand the present invention and not intended to limit the present invention.

Figure 2:
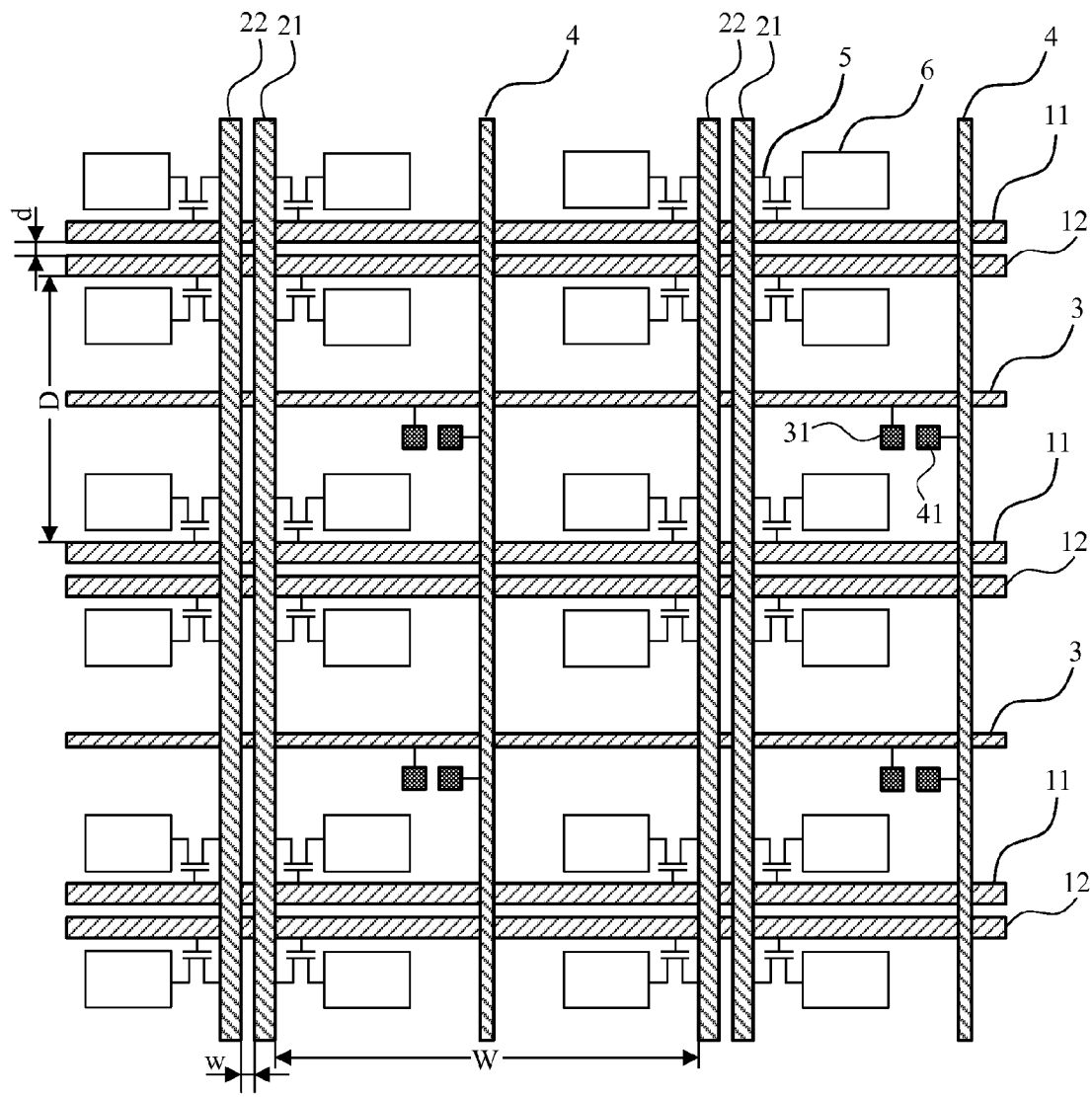
FIG. 2 is a schematic view illustrating the structure of an embedded touch array substrate according to the embodiment of the present invention.

Referring to FIG. 2, the embodiment of the present invention provides an embedded touch array substrate, which comprises:

multiple pairs of gate scanning lines and data lines arranged alternately;

a pixel switch 5 electrically connected with the gate scanning lines and the data lines;

a pixel electrode 6 electrically connected with the pixel switch 5;

a touch emission line 3 provided between two pairs of the gate scanning lines adjacent to each other;

a touch receiving line 4 provided between two pairs of the data lines adjacent to each other and intersecting the touch emission line 3; and a touch unit electrically connected with the intersection of the touch emission line 3 and the touch receiving line 4.

The gate scanning line and the data line according to the present embodiment utilize double lines, which provide individual trace area for the touch emission line 3 and the touch receiving line 4. It further decreases the interference between the panel driving signal and the touch signal, enhances the touch sensitivity, decreases the signal amplitude, and reduces the power consumption of the panel.

Specifically, in the several pairs of the gate scanning lines according to the present embodiment, each pair comprises a first gate scanning line 11 and a second gate scanning line 12 parallel and adjacent to each other. In the several pairs of the data lines, each pair comprises a first data line 21 and a second data line 22. The distance D between two pairs of the gate scanning lines adjacent to each other is larger than the distance d between the two gate scanning lines in each pair of the gate scanning lines, namely, the distance d between the first gate scanning line 11 and the second gate scanning line 12 is smaller, and the distance D between two pairs of the gate scanning lines adjacent to each other is larger, which provides enough trace area for the touch emission line 3. Similarly, the distance W between two pairs of the data lines adjacent to each other is larger than the distance w between the two data lines in each pair of the data lines, namely, the distance w between the first data line 21 and the second data line 22 is smaller, and the distance W between two pairs of the data lines adjacent to each other is larger, which provides enough trace area for the touch receiving line 4.

The touch unit at the intersection of the touch emission line 3 and the touch receiving line 4 comprises a first touch point 31 and a second touch point 41. The first touch point 31 is electrically connected to the touch emission line 3, and the second touch point 41 is electrically connected to the touch receiving line 4.

Figure 3:
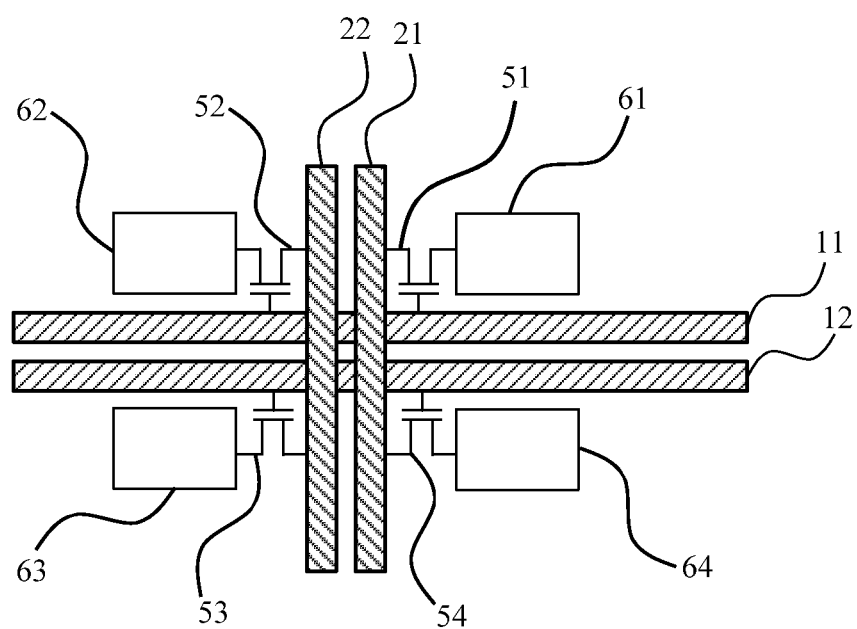
FIG. 3 is a schematic view illustrating the partial structure of an embedded touch array substrate according to the embodiment of the present invention.

Referring to FIG. 3, it is a schematic view illustrating the partial structure of FIG. 2, which illustrates the relationship of the pixel unit (comprising the pixel switch 5 and the pixel electrode 6) connecting with the gate scanning line and the data line when the gate scanning line and the data line according to the present embodiment utilizing double lines. The first gate scanning line 11 and the second gate scanning line 12 intersect the first data line 21 and the second data line 22 to form a #-shaped structure. Wherein, the first gate scanning line 11 is located above the second gate scanning line 12, and the first data line 21 is located at the right side of the second data line 22. The first pixel switch 51 is electrically connected with the first gate scanning line 11 and the first data line 21, respectively. The first pixel electrode 61 is electrically connected with the first pixel switch 51. The second pixel switch 52 is electrically connected with the first gate scanning line 11 and the second data line 22, respectively. The second pixel electrode 62 is electrically connected with the second pixel switch 52. The third pixel switch 53 is electrically connected with the second gate scanning line 12 and the second data line 22, respectively. The third pixel electrode 63 is electrically connected with the third pixel switch 53. The fourth pixel switch 54 is electrically connected with the second gate scanning line 12 and the first data line 21, respectively. The fourth pixel electrode 61 is electrically connected with the fourth pixel switch 54. Namely, the pixel switches 51, 52 and the pixel electrodes 61, 62 electrically connected with the first gate scanning line 11 are respectively symmetrical to the pixel switches 53, 54 and the pixel electrodes 63, 64 electrically connected with the second gate scanning line 12; the pixel switches 51, 54 and the pixel electrodes 61, 64 electrically connected with the first data line 21 are respectively symmetrical to the pixel switches 52, 53 and the pixel electrodes 62, 63 electrically connected with the second data line 22.

In the present embodiment, the pixel switch 5 is a thin film transistor (TFT).

Figure 1:
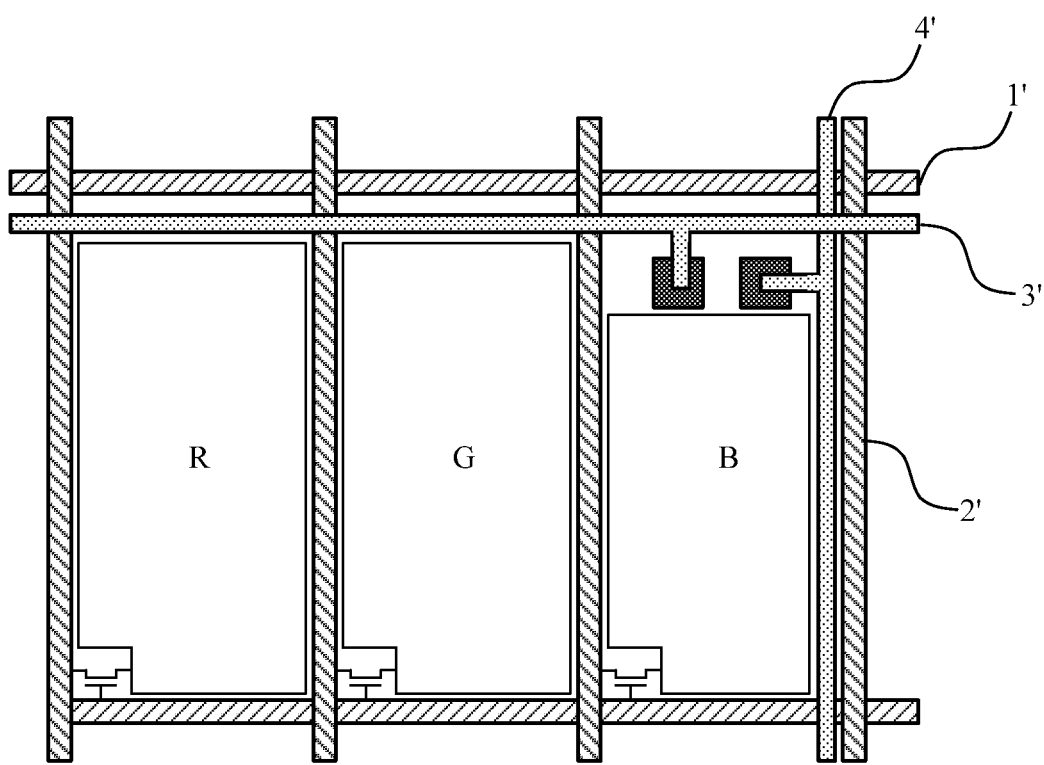
FIG. 1 is a schematic view illustrating the circuit structure of the in-cell touch array substrate panel according to the existing technology.

Moreover, in the in-cell touch array substrate panel according to the existing technology shown in FIG. 1, the touch emission line 3' is completed using the process film beyond the gate scanning line 1', the touch emission line 4' is completed using the process film beyond the data line 2', which has complex process and higher costs. In the present embodiment, the touch emission line 3 and the gate scanning lines 11, 12 utilize the same metal patterning, and the touch receiving line 4 and the data lines 21, 22 utilize the same metal patterning, which simplifies the process and reduces costs.

It should be noted that the gate scanning line and the data line of the embedded touch array substrate according to the present embodiment utilize double lines, which can be connected with more pixel switches and pixel electrodes comparing to the signal line, so it enlarges the display area. In addition, the touch emission line and the touch receiving line used for touch function provide the individual trace area, which decreases the interference between the panel driving signal and the touch signal and enhances the touch sensitivity, so it is especially suitable for large-size liquid crystal display panels with touch function.

Corresponding to the embedded touch array substrate according to the first embodiment of the present invention, the second embodiment of the present invention provides a liquid crystal display panel, which comprises:
an embedded touch array substrate;
a color filter substrate, which is opposite to the embedded touch array substrate; and
a liquid crystal layer, which is provided between the embedded touch array substrate and the color filter substrate;
wherein, the embedded touch array substrate comprises:
multiple pairs of gate scanning lines and data lines arranged alternately;
a pixel switch electrically connected with the gate scanning lines and the data lines;
a pixel electrode electrically connected with the pixel switch;
a touch emission line provided between two pairs of the gate scanning lines adjacent to each other;
a touch receiving line provided between two pairs of the data lines adjacent to each other and intersecting the touch emission line; and
a touch unit electrically connected with the intersection of the touch emission line and the touch receiving line.

The specific structure and the corresponding technology about the embedded touch array substrate according to the present embodiment can refer to the illustration of the first embodiment and FIGS. 1 to 3, which is not repeated here.

The preferred embodiments according to the present invention are mentioned above, which cannot be used to define the scope of the right of the present invention. Those modifications and variations are considered encompassed in the scope of protection defined by the claims of the present invention.

What is claimed is:

1. An embedded touch array substrate, which comprises:
multiple pairs of gate scanning lines and data lines arranged alternately;
a pixel switch electrically connected with the gate scanning lines and the data lines;
a pixel electrode electrically connected with the pixel switch;
a touch emission line provided between two pairs of the gate scanning lines adjacent to each other;
a touch receiving line provided between two pairs of the data lines adjacent to each other and intersecting the touch emission line; and
a touch unit electrically connected with the intersection of the touch emission line and the touch receiving line,
wherein, each pair of the gate scanning lines comprise a first gate scanning line and a second gate scanning line parallel and adjacent to each other, the distance between two pairs of the gate scanning lines adjacent to each other is larger than that between the first gate scanning line and the second gate scanning line,
wherein, each pair of the data lines comprise a first data line and a second data line, the distance between two lairs of the data lines adjacent to each other is larger than that between the first data line and the second data line.

2. The embedded touch array substrate as claimed in claim 1, wherein the first gate scanning line (11) is located above the second gate scanning line (12), and the first data line (21) is located at the right side of the second data line (22).

3. The embedded touch array substrate as claimed in claim 2, wherein the pixel switches (51, 52) and the pixel electrodes (61, 62) electrically connected with the first gate scanning line (11) are respectively symmetrical to the pixel switches (53, 54) and the pixel electrodes (63, 64) electrically connected with the second gate scanning line (12); the pixel switches (51, 54) and the pixel electrodes (61, 64) electrically connected with the first data line (21) are respectively symmetrical to the pixel switches (52, 53) and the pixel electrodes (62, 63) electrically connected with the second data line (22).

4. The embedded touch array substrate as claimed in claim 3, wherein the pixel switch is a thin film transistor.

5. The embedded touch array substrate as claimed in claim 1, wherein the touch unit comprises a first touch point (31) and a second touch point (41), the first touch point (31) is electrically connected to the touch emission line (3), and the second touch point (41) is electrically connected to the touch receiving line (4).

6. The embedded touch array substrate as claimed in claim 1, wherein the touch emission line and the gate scanning line utilize the same metal patterning, and the touch receiving line and the data line utilize the same metal patterning.

7. An embedded touch array substrate, comprising:

multiple pairs of gate scanning lines and data lines arranged alternately;
a pixel switch electrically connected with the gate scanning lines and the data lines;
a pixel electrode electrically connected with the pixel switch;
a touch emission line provided between two pairs of the gate scanning lines adjacent to each other;
a touch receiving line provided between two pairs of the data lines adjacent to each other and intersecting the touch emission line; and
a touch unit electrically connected with the intersection of the touch emission line and the touch receiving line;
wherein, each pair of the gate scanning lines comprise a first gate scanning line (11) and a second gate scanning line (12) parallel and adjacent to each other, the distance between two pairs of the gate scanning lines adjacent to each other is larger than that between the first gate scanning line (11) and the second gate scanning line (12).

8. A liquid crystal display panel, comprising:
an embedded touch array substrate;
a color filter substrate, which is opposite to the embedded touch array substrate; and
a liquid crystal layer, which is provided between the embedded touch array substrate and the color filter substrate;
wherein, the embedded touch array substrate comprises:
multiple pairs of gate scanning lines and data lines arranged alternately;
a pixel switch electrically connected with the gate scanning lines and the data lines;
a pixel electrode electrically connected with the pixel switch;
a touch emission line provided between two pairs of the gate scanning lines adjacent to each other;
a touch receiving line provided between two pairs of the data lines adjacent to each other and intersecting the touch emission line; and
a touch unit electrically connected with the intersection of the touch emission line and the touch receiving line,
wherein, each pair of the gate scanning lines comprise a first gate scanning line and a second gate scanning line parallel and adjacent to each other, the distance between two pairs of the gate scanning lines adjacent to each other is larger than that between the first gate scanning line and the second gate scanning line.

9. The liquid crystal display panel as claimed in claim 8, wherein each pair of the data lines comprise a first data line (21) and a second data line (22), the distance between two pairs of the data lines adjacent to each other is larger than that between the first data line (21) and the second data line (22).

10. The liquid crystal display panel as claimed in claim 9, wherein the first gate scanning line (11) is located above the second gate scanning line (12), and the first data line (21) is located at the right side of the second data line (22).

11. The liquid crystal display panel as claimed in claim 10, wherein the pixel switches (51, 52) and the pixel electrodes (61, 62) electrically connected with the first gate scanning line (11) are respectively symmetrical to the pixel switches (53, 54) and the pixel electrodes (63, 64) electrically connected with the second gate scanning line (12); the pixel switches (51, 54) and the pixel electrodes (61, 64) electrically connected with the first data line (21) are respectively symmetrical to the pixel switches (52, 53) and the pixel electrodes (62, 63) electrically connected with the second data line (22).

12. The liquid crystal display panel as claimed in claim 11, wherein the pixel switch is a thin film transistor.

13. The liquid crystal display panel as claimed in claim 8, wherein the touch unit comprises a first touch point (31) and a second touch point (41), the first touch point (31) is electrically connected to the touch emission line (3), and the second touch point (41) is electrically connected to the touch receiving line (4).

14. The liquid crystal display panel as claimed in claim 8, wherein the touch emission line and the gate scanning line utilize the same metal patterning, and the touch receiving line and the data line utilize the same metal patterning.

\* \* \* \* \*